United States Patent
Wang et al.

(10) Patent No.: US 10,191,076 B1
(45) Date of Patent: Jan. 29, 2019

(54) AIRFLOW SENSING SYSTEMS AND METHODS

(71) Applicants: Gang Wang, Madison, AL (US); Felix Ewere, Huntsville, AL (US)

(72) Inventors: Gang Wang, Madison, AL (US); Felix Ewere, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 170 days.

(21) Appl. No.: 14/950,243

(22) Filed: Nov. 24, 2015

(51) Int. Cl.
| | | |
|---|---|---|
| *G01P 5/02* | (2006.01) | |
| *G01P 5/08* | (2006.01) | |
| *G01H 11/08* | (2006.01) | |
| *G01P 5/06* | (2006.01) | |
| *G01P 5/07* | (2006.01) | |

(52) U.S. Cl.
CPC .............. *G01P 5/02* (2013.01); *G01H 11/08* (2013.01); *G01P 5/06* (2013.01); *G01P 5/07* (2013.01); *G01P 5/08* (2013.01); *G01P 5/083* (2013.01); *G01P 5/086* (2013.01)

(58) Field of Classification Search
CPC ...... G01P 5/02; G01P 5/04; G01P 5/06; G01P 5/07; G01P 5/08; G01P 5/083; G01P 5/086
See application file for complete search history.

(56) References Cited

U.S. PATENT DOCUMENTS

| 5,874,673 | A | 2/1999 | Greene | |
|---|---|---|---|---|
| 2008/0072682 | A1* | 3/2008 | Liu | G01F 1/28 73/756 |
| 2009/0142192 | A1* | 6/2009 | LeClair | G01P 5/06 416/9 |
| 2013/0283922 | A1* | 10/2013 | Qualtieri | G01Q 10/045 73/774 |
| 2015/0377915 | A1* | 12/2015 | Claudel | G01P 5/02 73/170.02 |

OTHER PUBLICATIONS

Barrero-Gil, Antonio, G. Alonso, and A. Sanz-Andres. "Energy harvesting from transverse galloping." Journal of Sound and Vibration 329.14 (2010): 2873-2883.*

(Continued)

*Primary Examiner* — Lisa Caputo
*Assistant Examiner* — Herbert K Roberts
(74) *Attorney, Agent, or Firm* — Maynard Cooper & Gale, P.C.; Jon E. Holland

(57) ABSTRACT

A flow of air induces vibration of a tip of an airflow sensor. A cantilever coupled to the tip vibrates as the tip is displaced, and a piezoelectric element associated with the cantilever generates an electrical signal in response to mechanical stress or strain induced by vibration of the cantilever. A control element that is in communication with the piezoelectric element of the cantilever receives the electrical signal and derives at least one parameter indicative of the flow of air sensed by the sensor. The control element communicates or otherwise transmits an output signal that is indicative of the parameter to an output device to display sensor data to a user as desired.

23 Claims, 11 Drawing Sheets

(56) References Cited

OTHER PUBLICATIONS

Seo, Young Ho, and Byeong Hee Kim. "A self-resonant micro flow velocity sensor based on a resonant frequency shift by flow-induced vibration." Journal of Micromechanics and Microengineering 20.7 (2010): 075024.*
Knight, et al., "Low Airspeed Measuring Devices for Helicopter Usage Monitoring Systems," Defence Science & Technology, Air Vehicles Division Platforms Laboratory, DSTO-TN-0495, pp. 1-33.
Ewere, et al., "Journal of Intelligent Material Systems and Structures," http://jim.sagepub.com/content/early/2013/11/13/1045389X13505251, Nov. 19, 2013.
Ewere, et al., "Experimental Investigation of Galloping Piezoelectric Energy Harvesters with Bluff Bodies," IOP Publishing, Smart Mater, Struct. 23, (2014).

\* cited by examiner

AIRFLOW SENSING SYSTEMS AND METHODS

RELATED ART

A variety of technologies and applications require precise airflow measurements across a wide range of airflow speeds. Modern airflow sensors sense airflow using principles such as thermal anemometry (e.g., hot-wire or hot-film anemometers), Laser Doppler Velocimetry, Particle Image Velocimetry, indirect inference from pressure differences (i.e., through the Coriolis effect) and utilizing wall-shear forces. Such systems present high costs to the user in terms of expense, complex setup and use, and burdensome size. Unfortunately, it is difficult or impossible in many existing small or low cost systems to accurately and unambiguously sense characteristics of airflow across a wide range of velocities, specifically at low velocities. For example, pitot tubes, which are normally used for measuring airspeed on aircraft, do not usually have sufficient resolution to enable accurate measurements of low airspeeds. Thus, improved systems for sensing airflow are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to airflow sensing systems and methods. A sensor has a cantilever with a tip that is exposed to airflow. Air flows across a front face of the tip on a distal end of the cantilever. A shield surrounding the cantilever prevents air flow from interacting with the cantilever so that only the tip is encounters to airflow. As air flows across the face of the tip, aerodynamic forces (e.g., lift and drag) are exerted on the tip. The tip experiences vibration when air flows across the tip's surface at a sufficient speed to cause the tip to experience aeroelastic instability and undergo displacement. Vibration experienced by the tip is transferred to the cantilever, which vibrates at a frequency close to its natural frequency. A piezoelectric material associated with the cantilever generates an electrical signal based on mechanical stress and strain in the cantilever caused by the vibrating tip. The electrical signal is thus indicative of the vibration of the tip and the speed of the airflow that caused such vibration. A control element in communication with the piezoelectric material receives the electrical signal, and derives at least one parameter that is indicative of characteristics of airflow across the face of the tip. The control element generates an output signal indicative of the at least one parameter, and communicates the output signal to an output device for output to a user.

In an exemplary embodiment, an airflow sensor has a single cantilever with a first end and a second end. The cantilever is coupled to a tip at its first end, and is coupled to a substrate at its second end. A shield surrounds the cantilever around its longitudinal axis and generally shields it from the airflow. A piezoelectric material embedded in or otherwise associated with the cantilever generates an electrical signal and communicates it to a control element that is in communication with the piezoelectric element. The control element is coupled to or embedded in the substrate, which is fixed with respect to the cantilever. The control element can communicate or otherwise output an output signal comprising information that is indicative of the electrical signal received from the piezoelectric element to an output device or other device to display the information to a user as may be desired.

Figure 1A:
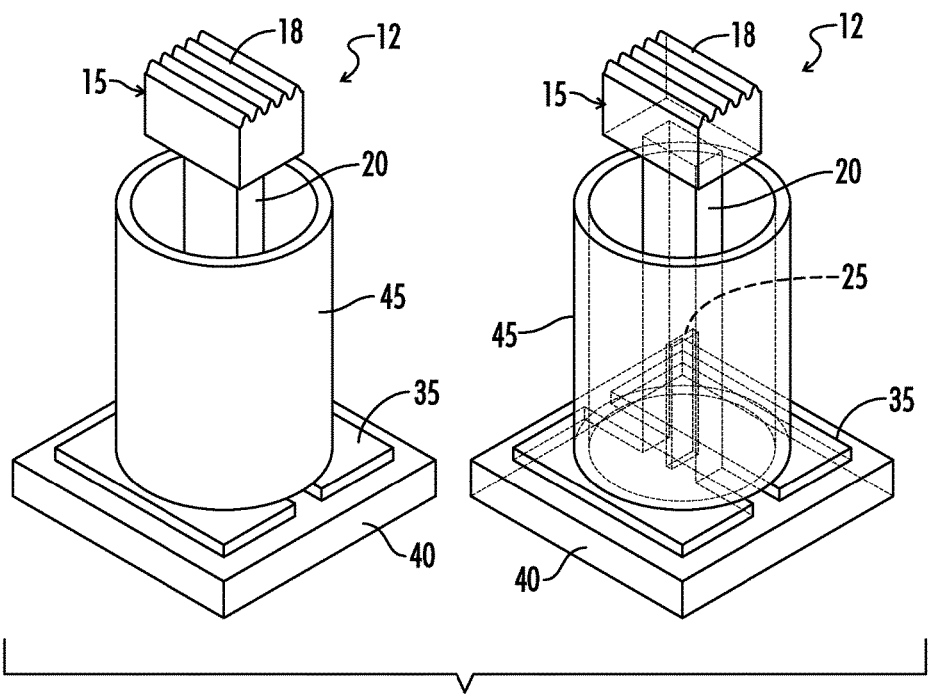
FIG. 1A is a three-dimensional perspective view of an exemplary embodiment of an airflow sensor.

FIG. 1A depicts an exemplary embodiment of an airflow sensor 12. The sensor 12 has a tip 15 for interacting with air flowing across the tip 15. In the instant embodiment, the tip 15 comprises a bluff body having a generally uniform rectangular cross section, but other shapes and cross sections of the tip 15 are possible in other embodiments. Note that the tip 15 is shaped to generate aerodynamic forces on the cantilever 20 when airflow passes over the surface of the tip 15 for controlling or enhancing movement of the cantilever 20 resulting from the airflow. In one embodiment, the tip 15 has a face 18 disposed on a front side of the tip 15; that is, the face 18 is oriented on a side of the tip 15 exposed to airflow, as described further below. Note that the face 18 of the exemplary embodiment depicted by FIG. 1A has a generally flat surface profile, but in other embodiments, other surface profile shapes of the face 18 are possible. Note also that the surface profile shape of the face 18 is selected in order to ensure vibration starts at the desired vibration frequency when tip 15 undergoes aeroelastic instability (i.e., "galloping") as the face 18 encounters a desired airflow. More specifically, the shape of the face 18 can be used to control the airspeed at which the flow induces measurable vibration of the tip 15, referred to herein as the "galloping speed" of the tip 15. The surface profile shape of the face 18 of each tip 15 is selected to control the galloping speed of the tip 15, and thereby, the frequency at which its respective cantilever 20 will vibrate. When the air flows across the tip 15 at or above the galloping speed, the tip 15 vibrates very close to its natural frequency; the natural frequency may be used as a reference for distinguishing noise in frequency of vibration of the tip 15. Thus, the frequency of the electrical signal generated by the piezoelectric element 25 will correspond to the natural frequency of the cantilever 20. The control element 35 is configured to identify the sensor 12 where the signal originated based on the frequency of the electrical signal. Thus, each sensor 12 corresponds to a particular velocity of airflow, and the control element 35 is configured to determine the velocity of the airflow that corresponds to an electrical signal generated by each respective sensor 12. For each cantilever 20, the shape of the face 18 can be adjusted to generate a different electrical signal based on how the shape of the face 18 affects the galloping speed of the tip 15. In one embodiment, the face 18 has a surface profile that is curved (e.g., sinusoidal, such as Hanning waves) in shape, and produces a vibration of the tip 15 at its natural frequency when the tip 15 encounters a desired airflow. Other vibration frequencies of the tip 15 may be achieved for other airflows in other embodiments by selecting other surface profiles for the face 18 as may be desired.

Note that, in embodiments where the face 18 has a wavy profile shape, the profile of the face 18 may be tapered toward a center point of the face from a top and bottom edge of the face 18 or otherwise varied to alter the aerodynamic efficiency of the tip 15. In yet other embodiments, the surface profile of the face 18 may be spherical, elliptical, grooved or patterned, and other shapes of the surface profile of the face 18 are possible. The sensor 12 may comprise a tip 15 having any suitable shape of the face 18 that will enable the tip 15 to undergo galloping when encountering a desired airspeed in other embodiments.

In an exemplary embodiment, the sensor 12 comprises a cantilever 20. In one embodiment, the cantilever 20 has a generally rectangular cross section and composed of material capable of transmitting vibrations indicative of galloping experienced by the tip 15. A piezoelectric element 25 is positioned on (e.g., embedded within or coupled to the surface of) the cantilever 20. In the exemplary embodiment depicted by FIG. 1A, the piezoelectric element 25 comprises a strip of piezoelectric fiber and is embedded within the surface of the cantilever 20. In this regard, as the cantilever 20 experiences vibrations due to galloping of the tip 15, the piezoelectric element 25 converts transverse strain induced by displacement of the tip 15 (and, hence, the cantilever 20) during vibration into an electrical signal (e.g., voltage). A control element 35 coupled to the piezoelectric element 25 receives the electrical signal from the piezoelectric element 25 and, based on the electrical signal, derives at least one parameter indicative of characteristics of airflow inducing the vibration, as described in further detail below.

Note that the cantilever 20 comprises a beam having a first end and a second end. The first end of the cantilever 20 forms the tip 15. In some embodiments, the tip 15 may be coupled to the cantilever 20. Note that the face 18 faces away from the cantilever 20. The second end of the cantilever 20 is coupled (e.g., clamped, glued, embedded or otherwise) to a substrate 40. In the exemplary embodiment of FIG. 1A, the substrate 40 has a generally flat surface, but other surfaces of the substrate 40 are possible in other embodiments, as discussed hereafter. Note that the control element 35 may be fixed with regard to the substrate 40, such that the control element 35 cannot move independently of the substrate 40. FIG. 1A depicts a control element 35 coupled to the surface of the substrate 40, but other locations of the control element 35 are possible in other embodiments. The substrate 40 may comprise or otherwise be disposed about a clamp or other device for coupling the second end of the cantilever 20 so that it cannot move independently of the substrate 40.

In the exemplary embodiment of FIG. 1A, a shield 45 surrounds the cantilever 20 about a longitudinal axis of the cantilever 20, for preventing airflow from making contact with the cantilever 20. The shield 45 is hollow and cylindrical in shape and has a first end that is positioned on the substrate 40. The cantilever 20 passes inside the shield 43. In this regard, the shield 45 surrounds the cantilever 20, such that airflow directed at the cantilever 20 cannot make contact with the surface of the cantilever 20. The cantilever 20 experiences vibration when air flows across the tip 15 in a direction that is generally parallel to the longitudinal axis of the cantilever 20. In the exemplary embodiment depicted by FIG. 1A, the length of the cantilever 20 exceeds the length of the shield 45, such that a portion of the cantilever 20 protrudes from a second end of the shield 45, thereby permitting the tip 15 to vibrate freely when the tip 15 encounters airflow. In other embodiments, it is unnecessary for the cantilever 20 to protrude beyond the second end of the shield 45, and other lengths of the shield 45 and cantilever 20 are possible.

Note that the electrical signal generated by the piezoelectric element 25 is generally indicative of the frequency of vibration experienced by the tip 15 and the cantilever 20. In an exemplary embodiment, the piezoelectric element 25 comprises a solid material embedded on the surface of the cantilever 20 such that displacement of the cantilever 20 over time may be converted into an electrical signal by the piezoelectric element 25 according to conventional techniques. In this regard, the piezoelectric element 25 is capable of producing an electrical signal that is indicative of the vibration experienced by the tip 15 and cantilever 20. In the exemplary embodiment depicted by FIG. 1A, the control element 35 is capable of deriving at least one parameter indicative of airflow across the tip 15 and generating an output signal that is indicative of the at least one parameter. The control element 35 is further configured to communicate the output signal as described further below. Note that the control element 35 depicted by FIG. 1A comprises sensing circuitry (not specifically shown in FIG. 1A) and is implemented in hardware, but the control element 35 may be implemented in a combination of hardware and software in other embodiments.

Figure 1B:
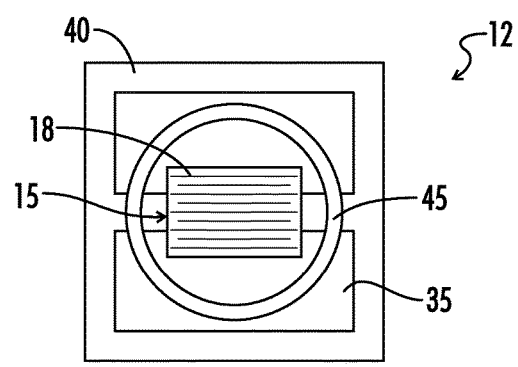
FIG. 1B depicts a front view of an exemplary embodiment of an airflow sensor.

FIG. 1B depicts a front view of the airflow sensor 12. In the exemplary embodiment depicted by FIG. 1B, the sensor 12 has a tip 15 that is roughly rectangular cross-section and has a face 18 having a roughly flat surface profile on a front surface of the tip 15 as noted above. Note that, in embodiments where the tip 15 has a face 18 having a curved (e.g., sinusoidal) surface profile, aerodynamic forces exerted on the tip 15 (i.e., lift and drag) may be reduced or otherwise altered according to the aerodynamic properties of the tip 15 based on, among other things, the surface profile of the face 18. Thus, the degree to which the tip 15, and hence, the cantilever 20 is responsive to airflow may be controlled. For example, when the tip 15 comprises a bluff body in which the face 18 has a generally flat surface profile, the tip 15 may experience greater aerodynamic forces and cause the cantilever 20 to vibrate at a higher frequency for a given airflow than it would if the face 18 had a more aerodynamically efficient profile. Alternatively, for surface profiles of the face 18 that reduce aerodynamic forces on the tip 15 (i.e., that increase its aerodynamic efficiency), the tip 15 and cantilever 20 may vibrate at a lower frequency when experiencing the same airflow. In this regard, the sensor 12 may be calibrated based on the aerodynamic properties of the face 18 of the tip 15, and the control element 35 is configured to determine at least one parameter indicative of characteristics of air flow experienced by the tip 15. For example, the control element 35 may derive such a parameter by relating the electrical signal from the piezoelectric element 25 to mechanical properties of the sensor 12, such as a predefined galloping speed for the tip 15. Note that different shapes, designs and patterns of the face 18 affect aerodynamic forces on the tip 15 to varying degrees based on the aerodynamic properties of the shape of the face 18. Thus, a variety of airspeeds can be sensed by changing the profile of the face 18 across various embodiments of the sensor 12.

Figure 2:
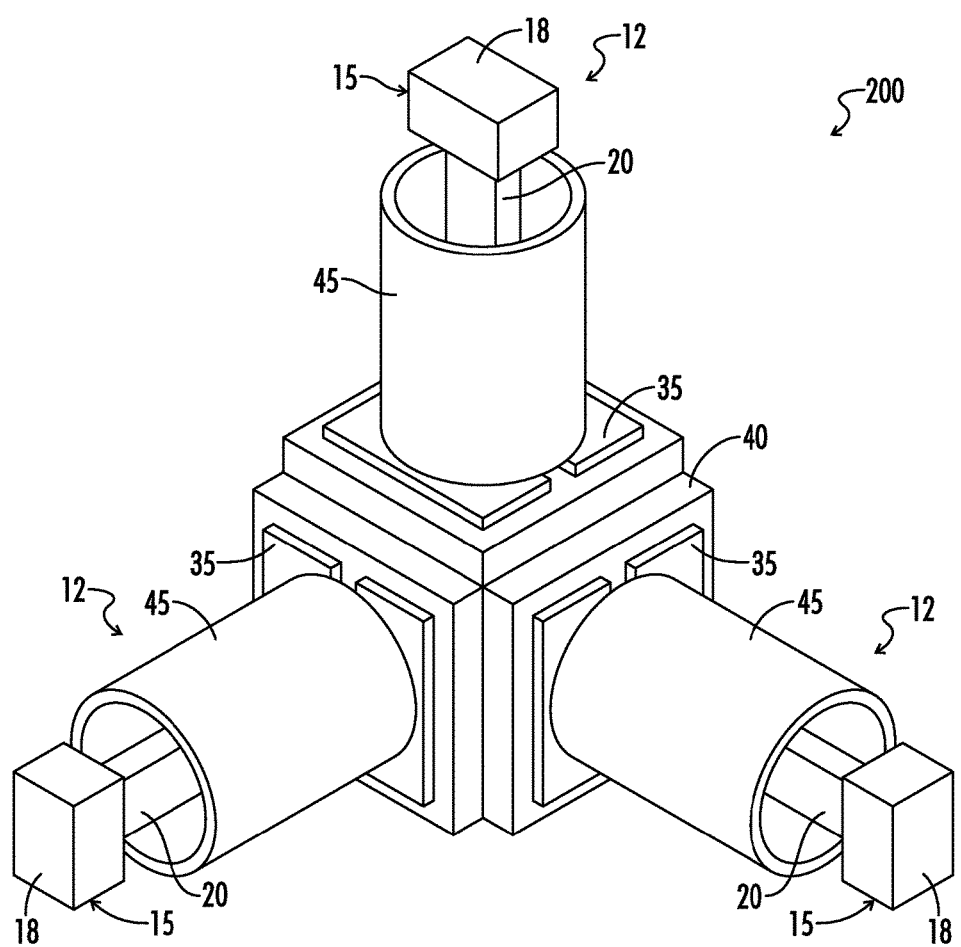
FIG. 2 is a three-dimensional perspective view of an exemplary embodiment of a group of three airflow sensors.

FIG. 2 depicts a group 200 of sensors 12 arranged to detect airspeed in three dimensions. For simplicity, the group 200 will be referred to herein as a rosette 200, but other arrangements of the group 200 are possible in other embodiments. In the exemplary embodiment of FIG. 2, the rosette 200 comprises three airflow sensors 12 oriented roughly perpendicularly with regard to one another (i.e., having the cantilever 20 of each sensor 12 oriented at a right angle with respect to the cantilever 20 of each adjacent sensor 12). In the embodiment depicted by FIG. 2, the rosette 200 has a substrate 40 which includes a plurality of control elements 35 embedded in or otherwise coupled to the substrate 40 that correspond to each of the three airflow sensors 12. In other embodiments, it is unnecessary for the rosette 200 to comprise a separate control element 35 for each airflow sensor 12, and the rosette 200 may comprise a central control element 35 in communication with the piezoelectric element 25 of each of the respective sensors 12.

Note that, in embodiments comprising a plurality of sensors 12 and a common control element 35, the control element 35 is configured to combine and distinguish between signals received from the respective piezoelectric elements 25 of each sensor 12. That is, the control element 35 is configured to identify or select an electrical signal from any of the plurality of sensors 12 as may be desired. In one embodiment, the control element 35 is configured to distinguish between or select an electrical signal from one of the plurality of sensors 12 as desired via Frequency Division Multiplexing, but other techniques for combining, distinguishing between or selecting electrical signals from one of the sensors 12 are possible in other embodiments. Note that the comparison between magnitudes sensed by adjacent sensors 12 may be performed by the control element 35, but comparisons may be performed by other means in other embodiments.

Note that each of the sensors 12 is configured to generate a unique electrical signal for vibration experienced by its tip 15 and cantilever 20. In embodiments having a central control element 35, the element 35 can use each unique signal to perform a comparison between magnitudes of wind speed experienced by each respective sensor 12 as described above. The control element 35 is configured to perform the comparison repeatedly in real time for a plurality of sensors 12 as desired to derive at least one parameter that is indicative characteristics of airflow across each tip 15 of each of the plurality of sensors 12. In an exemplary embodiment, the control element 35 derives a parameter that is indicative of velocity of air flowing across each sensor 12 of the rosette 200.

Figure 3:
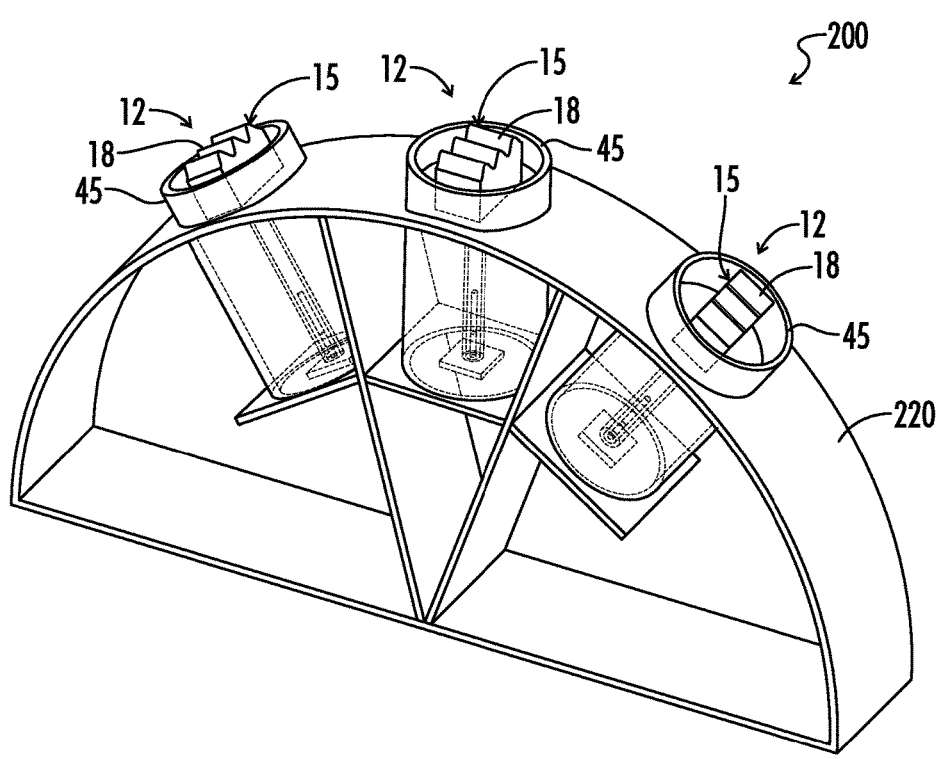
FIG. 3 is a three-dimensional perspective view of an alternative configuration of an exemplary embodiment of a group of three airflow sensors.

FIG. 3 depicts an alternative configuration of a rosette 200. In the instant embodiment, three adjacent sensors 12 are coupled to a curved base 220. Only the tip 15 and upper portion of the shield 45 of each sensor 12 protrude from the base 220 and are exposed to airflow. In general, velocity (i.e., speed and direction) of airflow can be determined based on comparison of airflow magnitudes sensed by a rosette 200 of three adjacent sensors 12. It has been observed that airflow velocity (a vector) can be adequately determined for most purposes using three adjacent sensors 12 oriented in the configuration shown in FIG. 3. In this regard, a magnitude of airflow sensed by each sensor 12 can be determined based on an electrical signal from a piezoelectric element 25 of each respective sensor 12. Speed and direction (scalar components of velocity) of airflow can be obtained based on a comparison of the magnitudes sensed by each sensor 12 with magnitudes sensed by each adjacent sensor 12 as a function of distance between the sensors 12. In this regard, if the control element 35 (not specifically shown in FIG. 3) determines based on the respective electrical signals that one of the sensors 12 is experiencing an airflow that is significantly higher than the airflow that is experienced by the adjacent sensors 12, the control element 35 (not specifically shown in FIG. 3) may be configured to determine that airflow that is encountered by the sensors 12 is in the direction of the sensor 12 that is generating a signal that is indicative of the greatest magnitude of airflow.

Note that, in some embodiments, the control element 35 (not specifically shown in FIG. 3) may be configured to derive or otherwise determine airflow velocity using parameters indicative of the configuration (e.g., positions of the sensors 12) of the rosette 200. At equilibrium, each sensor 12 at its referenced local coordinate is oriented at a zero angle of attack with regard to the incoming airflow. This induces maximum limit cycle oscillation amplitude in the tip 15 of each sensor 12 (i.e., galloping). In one embodiment, exemplary parameters include the value of an angle created between longitudinal axes of cantilevers 20 of adjacent sensors 12, but other parameters are possible in other embodiments. This angle is used to relate the sensed airflow direction to the global coordinate of the array, and may be adjusted to fit the desired application. It has been observed that the stability of a tip 15 configured as a square bluff body that is initially partially unstable at a zero degree angle of attack will become unstable at an increased mean angle of attack until after the angle exceeds about 13.5°; it then becomes relatively stable. It has further been observed that configurations in which the angle between longitudinal axes of adjacent cantilevers 20 equals approximately 15° will ensure an adequate directional sensing for many applications using the rosette 200 (i.e., the rosette 200 has adequate resolution), although other angles are possible. Additionally, the rosette 200 is preferably sensitive enough to detect flow levels and distinguish from noise.

In the exemplary embodiment of FIG. 3, airflow direction may be determined in addition to airflow speed magnitude rosette 200. The control element 35 (not specifically shown in FIG. 3) performs a simple comparison of airflow speed magnitude sensed by each sensor 12 with airflow speed magnitude sensed by its adjacent sensors 12. The instant configuration of the rosette 200 ensures a unique identity for the signals received by each sensor 12. In the instant embodiment, the control element 35 (not specifically shown in FIG. 3) is configured to perform the comparison for each sensor 12 of the rosette 200 and continue regularly performing the comparisons so that airflow data is determined with a high degree of resolution. In this regard, an entire airflow field may be captured with a resolution dependent on the value of an angle created between longitudinal axes of cantilevers 20 of adjacent sensors 12.

Figure 4:
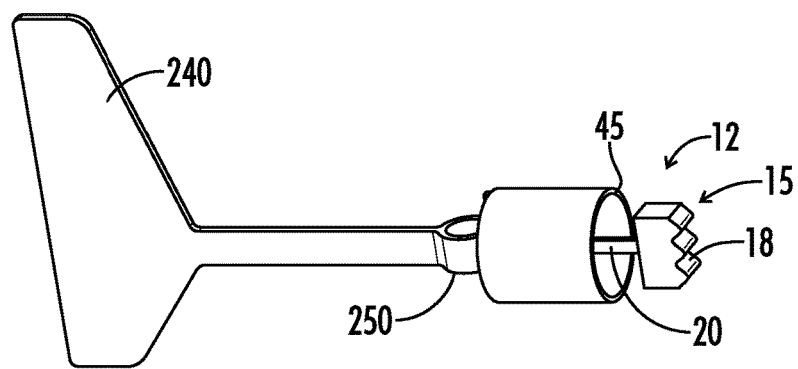
FIG. 4 is a three-dimensional perspective view of an alternative configuration of an exemplary embodiment of an airflow sensor.

FIG. 4 depicts an alternative configuration of an exemplary embodiment of an airflow sensor 12. As shown in FIG.

4, a sensor 12 is coupled to a wind vane 240. The wind vane 240 is configured to rotate or pivot about a hub 250 located behind the sensor 12 in response to airflow across the wind vane 240. Specifically, the wind vane 240 is designed to rotate such that its longitudinal axis is substantially parallel to the direction of airflow. Thus, as the direction of airflow changes, the wind vane 240 rotates about the hub 250. In one embodiment, the hub 250 comprises a Hall effect sensor or other suitable sensor for measuring rotation of the wind vane 240 about the hub 250, though other devices may be used for measuring rotation of the wind vane 240 in other embodiments. In the instant embodiment, galloping of the sensor 12 and rotation of the wind vane 240 about the hub 250 can be used together measure both airflow magnitude and direction simultaneously. The sensor 12 senses speed of airflow as a magnitude, as described above, and air flow direction is determined based on rotation of the wind vane 240 about the hub 250. In some embodiments, a control element 35 (not shown in FIG. 4) may receive at least one signal indicative of rotation of the wind vane 240 about the hub 250 and vibration of the tip 15 of the sensor 12 and determine at least one parameter indicative of airflow velocity based on the at least one signal.

Figure 5:
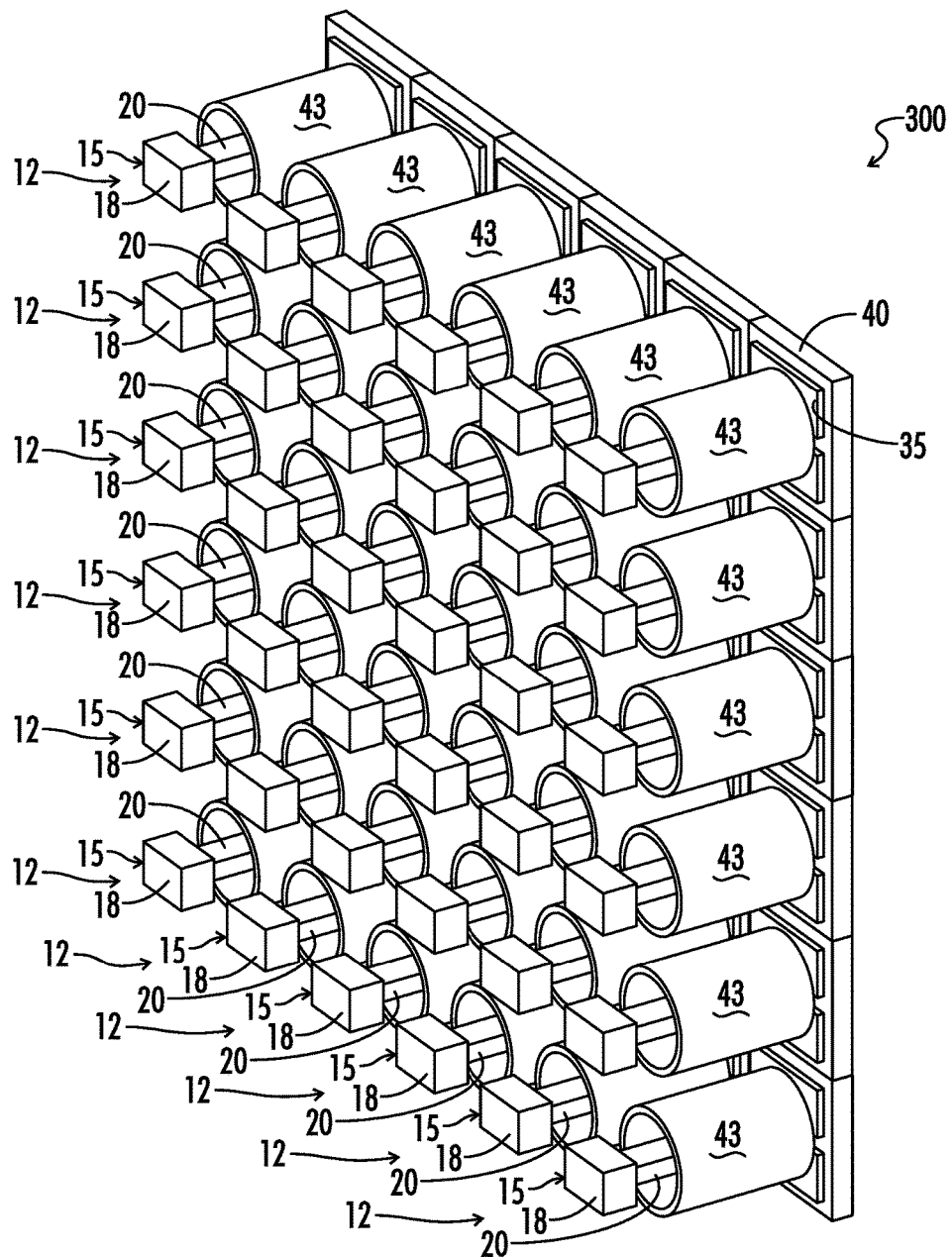
FIG. 5 is a three-dimensional perspective view of an exemplary embodiment of an airflow sensor array.

FIG. 5 depicts an array 300 of sensors 12. The array 300 comprises a plurality of sensors 12 arranged in columns and rows. In the embodiment of FIG. 5, each of the plurality of sensors 12 is oriented on the array 300 in a spacing that is equidistant from each other sensor 12 of the plurality of sensors 12, but other spacings and arrangements are possible in other embodiments. In the exemplary embodiment of FIG. 5, the array 300 comprises a control element 35 that is in communication with the piezoelectric element 25 of each of the plurality of sensors 12. That is, the control element 35 depicted by FIG. 5 is configured to receive electrical signals from each piezoelectric element 25 of the plurality of sensors 12 of the array 300. In this regard, the control element 35 is configured to evaluate at least one parameter indicative of characteristics of airflow across any portion of the array 300 based on electrical signals received from sensors 12 in the corresponding area and the characteristics (e.g., distance and angle between sensors 12) of the array 300. Using the techniques for separating and selecting each electrical signal (e.g., Frequency Division Multiplexing) the control element 35 is configured to compare each respective signal from each unique sensor 12 to determine what difference, if any, exists between magnitudes of airflow sent by each respective sensor 12.

Each of the plurality of sensors 12 of the array 300 comprises a shield 45 disposed around a cantilever 20 and generally cylindrical in shape. Each shield is oriented about a longitudinal axis of each of their respective cantilevers 20 of the plurality of sensors 12. In this regard, each shield 43 prevents interference with each respective cantilever 20 of each of the plurality of sensors 12 by airflow that is not flowing in the direction of the face 18 of each respective tip 15 of the plurality of sensors 12. Note that in the instant embodiment, each of the plurality of sensors 12 of the array 300 and the control element 35 are embedded in or otherwise coupled to a generally flat substrate 40. Thus, each of the respective plurality of sensors 12 is oriented such that each respective cantilever 20 of each sensor 12 is generally parallel to each other cantilever 20 of the plurality of sensors 12 when at rest. In other embodiments, it is not necessary for the substrate 40 to be generally flat, and other shapes of the substrate 40 are possible.

Note that the exemplary embodiment of the array 300 depicted by FIG. 5 comprises a first and second plurality of sensors 12 coupled to the substrate 40. Each sensor 12 of the first and second plurality of sensors 12 comprises a piezoelectric element 25 configured to generate a first and second plurality of electrical signals indicative of deflection that results from vibration of each respective tip 15 of the first and second plurality of sensors 12 induced by a flow of air. That is, the first plurality of electrical signals is indicative of vibration of each tip 15 of the first plurality of sensors 12 induced by a flow of air, and the second plurality of electrical signals is indicative of vibration of each tip 15 of the second plurality of sensors 12 induced by a flow of air. At least one parameter indicative of the flow of air sensed by each of the first and second plurality of sensors 12 may be derived based on at least the first and second plurality of electrical signals, as described further below.

Figure 6:
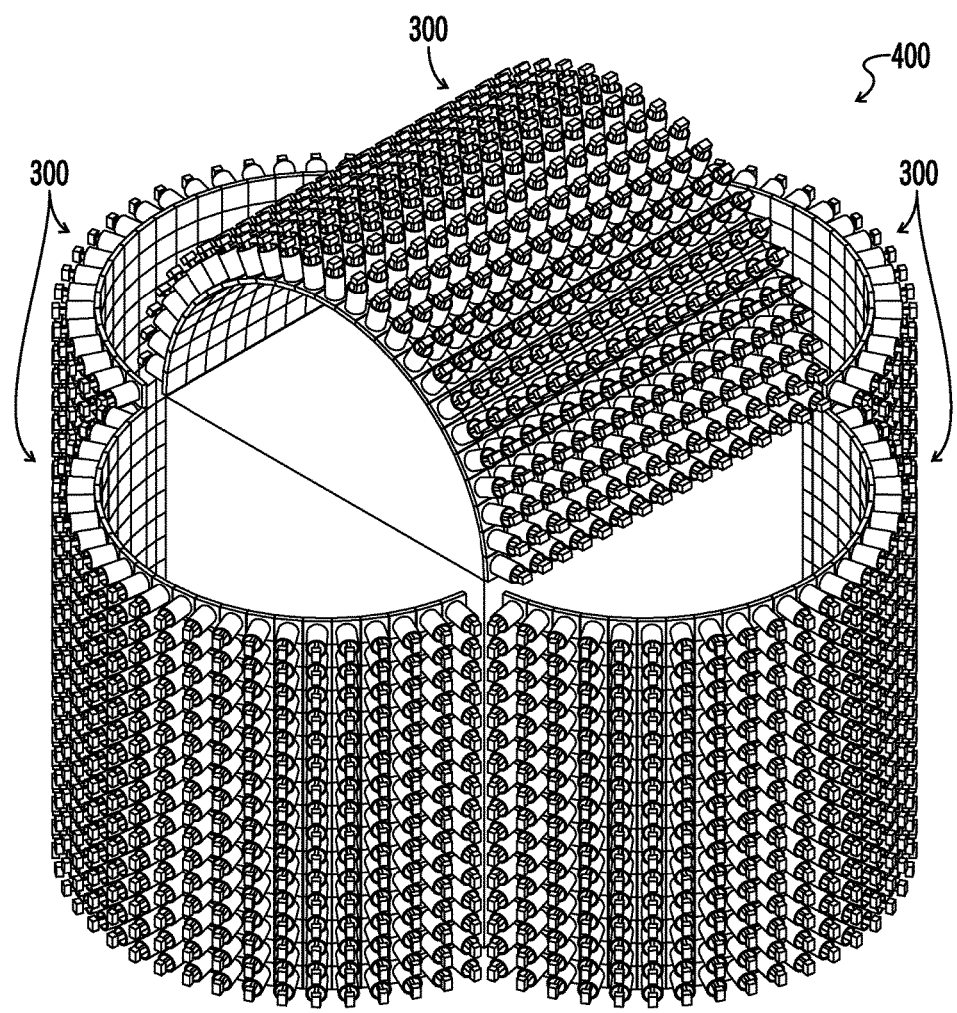
FIG. 6 is a three-dimensional perspective view of exemplary embodiment of a three-dimensional airflow sensor array.

FIG. 6 depicts a three-dimensional array 400. Airflow speed and direction can be determined in three dimensions based on signals from a three-dimensional array 400 comprising a plurality of arrays 300. In the exemplary embodiment of FIG. 6, six arrays 300 have a plurality of equidistant sensors 12 and are arranged about the sides of a geometric cube. That is, each array 300 of the three-dimensional array 400 has generally the same dimensions as each of the other arrays 300 in the three-dimensional array 400. Additionally, each array 300 in the three-dimensional array 400 comprises a curved substrate 40. In other embodiments, other shapes, quantities, and orientations of the respective arrays 300 are possible, and such characteristics of each array 300 of the three-dimensional array 400 may be adjusted as may be desired.

In the embodiment depicted by FIG. 6, each respective cantilever 20 and shield 45 of the plurality of sensors 12 of each array 300 has a roughly uniform length, but other lengths of each respective cantilever 20 and shield 45 of the plurality of sensors 12 of each array 300 are possible in other embodiments. Note that in the instant embodiment, the three-dimensional array 400 comprises a single control element 35 configured to determine the speed and direction of the wind interacting with each array 300 based on a plurality of electrical signals from the plurality of sensors 12 of the array 300. In this regard, the three-dimensional array 400 comprises a control element 35 (not specifically shown in FIG. 6) configured to determine at least one parameter indicative of characteristics of airflow across each respective array 300 using the techniques described above. As noted above, parameters indicative of characteristics of airflow experienced by each of the respective arrays 300 may be evaluated at a greater resolution as the number of sensors 12 comprised by the three-dimensional array 400 increases.

Figure 7:
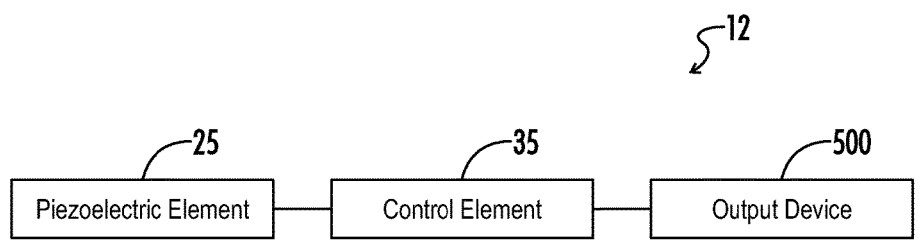
FIG. 7 is a block diagram illustrating an exemplary embodiment of an airflow sensor, such as is depicted by FIG. 1.

FIG. 7 depicts an exemplary embodiment of an airflow sensor 12. The sensor 12 comprises a piezoelectric element 25 configured to generate an electrical signal that is indicative of vibration of the cantilever 20 as described above. The piezoelectric element 25 is coupled to a control element 35, which is configured to receive the electrical signal from the piezoelectric element 25 and generate an output signal based on at least the electrical signal.

The embodiment depicted by FIG. 7 further comprises an output device 500 in communication with the control element 35. The control element 35 is configured to communicate the output signal to the output device 500 for output to a user as desired. In one embodiment, the output device 500 comprises a display device, such as a touchscreen display, or a liquid crystal display (LCD); in another embodiment, the output device 500 comprises an audio device for outputting an audible sound. Other types of output devices 500 are possible in other embodiments. The output device 500 is configured to output an output that is indicative of the output signal received from the control element 35, and as indicated above, the output signal may comprise one or more parameters indicative of airflow sensed by the airflow sensor 12. In one embodiment, the output device 500 is configured to display an output signal that is indicative of at least one parameter such as a velocity flow of air across a face 18 of a tip 15 (not specifically shown in FIG. 7) of the sensor 12, but the output signal may comprise other information or other parameters indicative of other characteristics of airflow in other embodiments. Note that, in an exemplary embodiment, the control element 35 can combine (e.g., average) measurements from multiple sensors 12 when generating the at least one parameter.

In one embodiment, the output device 500 is configured to transmit a message in response to receipt of an output signal from the control element 35. Note that the message may comprise information indicative of characteristics of airflow across a tip 15 of a sensor 12, as discussed below. Note also that the output device 500 may transmit the message wirelessly in some embodiments.

Figure 8:
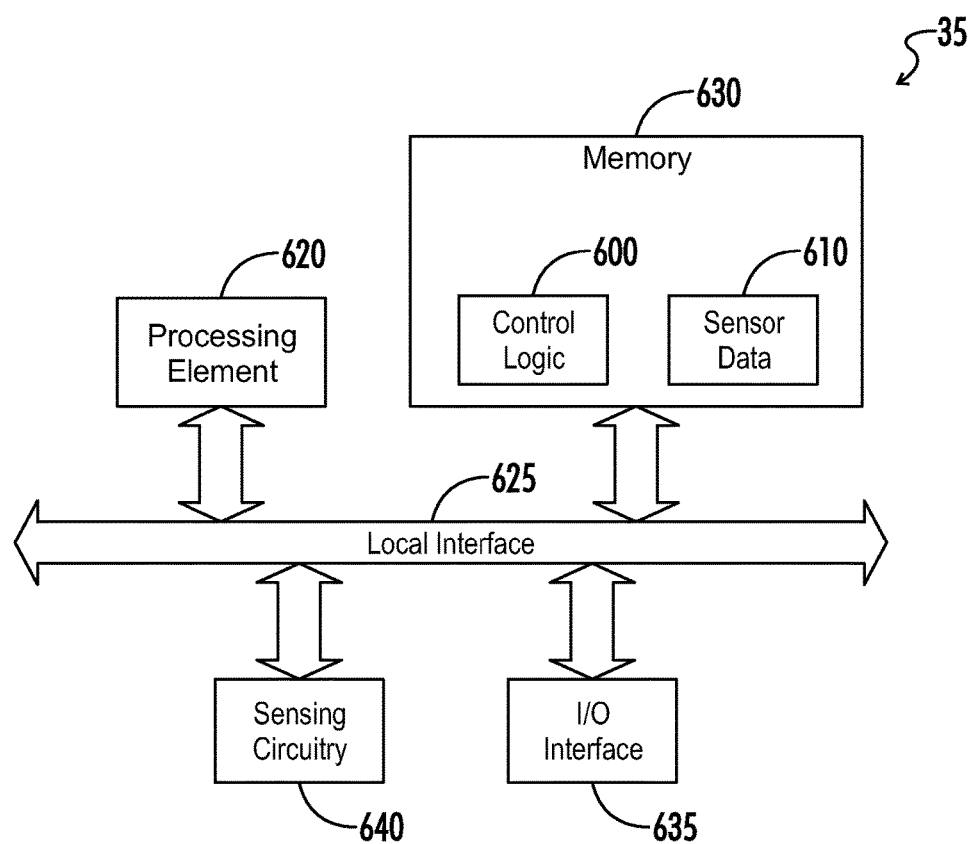
FIG. 8 depicts an exemplary embodiment of a control element of an airflow sensor.

FIG. 8 depicts an exemplary embodiment of a control element 35. The control element 35 is configured to receive an electrical signal from the piezoelectric element 25 and to produce an output signal that is indicative of a velocity of an airflow sensed by the sensor 12. The control element 35 has control logic 600, for generally controlling the operations of the control element 35, including collection of sensor data 610 that is indicative of at least an electrical signal generated by a piezoelectric element 25 in response to vibration of a cantilever 20 caused by airflow.

The exemplary control element 35 depicted by FIG. 8 comprises at least one conventional processing element 620, such as a digital signal processor (DSP) or a central processing unit (CPU), that communicates to and drives the other elements within the control element 35 via a local interface 625, which can include at least one bus. As an example, the processing element 620 is configured to retrieve and execute instructions of software stored in memory 630. Furthermore, an input/output (I/O) interface 635 can be used to output data to and receive input from a user. In one embodiment, the I/O interface 635 is coupled to the output device 500 (FIG. 7). As an example, the output device 500 may comprise a touchscreen that is configured to display information to the user and also accept inputs from the user, via capacitive sensing or otherwise, when the user touches the touchscreen. In other embodiments, the I/O interface 635 may comprise a separate input interface (not shown in FIG. 8), for receiving inputs from a user via an input device such as a keyboard, keypad, or mouse. As shown in FIG. 8, the control element 35 also has an interface for receiving input from sensing circuitry 640 that is configured to communicate an electrical signal generated by a piezoelectric element 25 of a sensor 12, as described above.

In an exemplary embodiment, information indicative of at least an electrical signal generated by a piezoelectric element 25 is stored as sensor data 610 in memory 630. In some embodiments, information stored in sensor data 610 also may be indicative of characteristics of each associated sensor 12. For example, for each sensor 12 in communication with the control element 35, the sensor data 610 may comprise information indicative of characteristics of each sensor 12, for example, the galloping speed of each tip 15 of each respective sensor 12, where the galloping speed is the airspeed at which air causes a tip 15 to vibrate. Note also that sensor data 610 may comprise information indicative of a plurality of electrical signals generated by the piezoelectric elements 25 of a plurality of cantilevers 20 that are indicative of vibration of the cantilevers 20 induced by a flow of air. The sensor data 610 may comprise such information for multiple sensors 12, for example, when arranged in an array 300 or three-dimensional array 400, as described above. For embodiments comprising a plurality of sensors 12, for example a rosette 200, array 300, or three-dimensional array 400, sensor data 610 may further comprise information indicative of the number, characteristics and arrangement of the plurality of sensors 12. In this regard, sensor data 610 comprises sufficient information to enable the control logic 600 to derive at least one parameter indicative of flow of air across at least one tip 15 of a sensor 12 based on the sensor data 610.

In an exemplary embodiment, the control logic 600 is implemented in software and is configured to store in memory 630 as sensor data 610 at least data that is indicative of at least an electrical signal received by the control element 35. In one embodiment, the control logic 600 stores in memory 630 sensor data 610 indicative of an electrical signal from a piezoelectric material 25. In some embodiments, the logic 600 is configured to perform filtering and conditioning of an electrical signal received from a piezoelectric element 25 before storing information indicative of the electrical signal in sensor data 610. For example, for an electrical signal received from a piezoelectric element 25, the logic 600 may perform signal conditioning, signal "lock-in" or filtering based on an expected vibration frequency of the tip 15 when vibrating at its natural frequency, and frequency extraction using conventional techniques, such as the Fast Fourier Transform. The logic 600 also may be configured to perform scaling of the electrical signal using predefined calibration data for the sensor 12 based on the characteristics of the tip 15 and cantilever 20. Note that, in an exemplary embodiment, the calibration data is stored in memory as sensor data 610. In this regard, the logic 600 is configured to derive at least one parameter indicative of flow of air across the tip 15 based on the sensor data 610.

Note also that the control logic 600 is configured to display information based on sensor data 610 via the I/O interface 635 as may be desired. In embodiments in which the output device 500 is configured to transmit a message in response to receipt of an output signal, the logic 600 generates a message indicative of at least sensor data for output via the output device 500. The logic 600 may display information via the I/O interface 635 based on other information in other embodiments. Further, in an exemplary embodiment, the logic 600 is configured to retrieve information stored in sensor data 610 in response to an input from a user.

Figure 9:
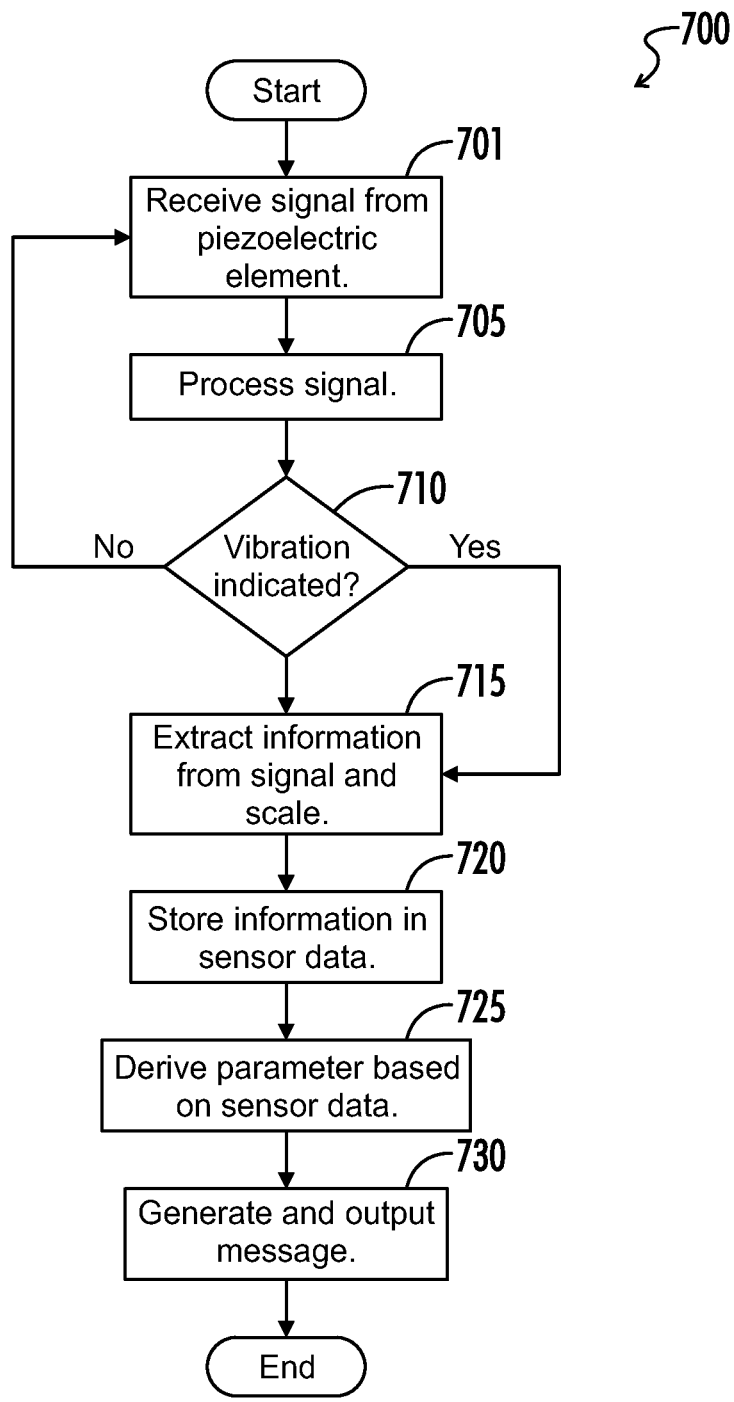
FIG. 9 is a flow chart illustrating an exemplary method of sensing airflow.

FIG. 9 is a flowchart depicting an exemplary method for sensing airflow. Although the steps 700 will be described as being performed by the control element 35, it will be understood that the steps 700 can be distributed over a plurality of control elements 35 (e.g., when present in a rosette 200, an array 300, or a three-dimensional array 400).

At step 701, the control element 35 receives an electrical signal from the piezoelectric element 25. The electrical signal is indicative of mechanical stress or strain induced on a cantilever 20 to which the piezoelectric element 25 that originated the electrical signal is coupled. Note that the electrical signal may be filtered or conditioned prior to receipt by the control element 35 in other embodiments.

At step 705 the control element 35 processes the electrical signal using information based on characteristics of various components of the sensor 12, such as the face 18, tip 15 and cantilever 20. Based on the information, the control element 35 can determine whether the signal indicates vibration above a threshold amount at step 710, for example, vibration caused by airflow.

At step 710, if the control element 35 determines that the electrical signal does not indicate vibration above the threshold amount, the control element 35 is configured to receive another electrical signal from the piezoelectric material 25 and begin again at step 701. If the control element 35 determines that the electrical signal received does indicate vibration above the threshold amount, processing continues on to step 715.

At step 715, the control element 35 extracts information, such as a frequency component from the electrical signal and scales the signal using calibrated data based on characteristics of the sensor 12. At 720, the control element 35 stores the information in memory 630 as sensor data 610. Sensor data 610 may comprise a variety of other information indicative of electrical signals from the sensor 12, as noted above.

At step 725, the control element 35 derives a parameter indicative of airflow based on the sensor data 610. The parameter derived is indicative of characteristics of airflow, for example speed, direction, or other characteristics of a flow of air encountered by the sensor 12. The control element 35 may derive a variety of parameters at step 725, but at least one parameter is derived at step 725.

At step 730, the control element 35 generates a message indicative of the at least one parameter derived at step 725 and communicates the message to an output device 500. The message may comprise text, graphics, or other symbols to convey information to a user. The control element 35 may communicate the message directly to the output device 500 in an exemplary embodiment or via the I/O interface 635 in some embodiments. The control element 35 generates and outputs a message indicative of the at least one parameter for based on the sensor data 610, and the control element 35 ends the routine.

Figure 10A:
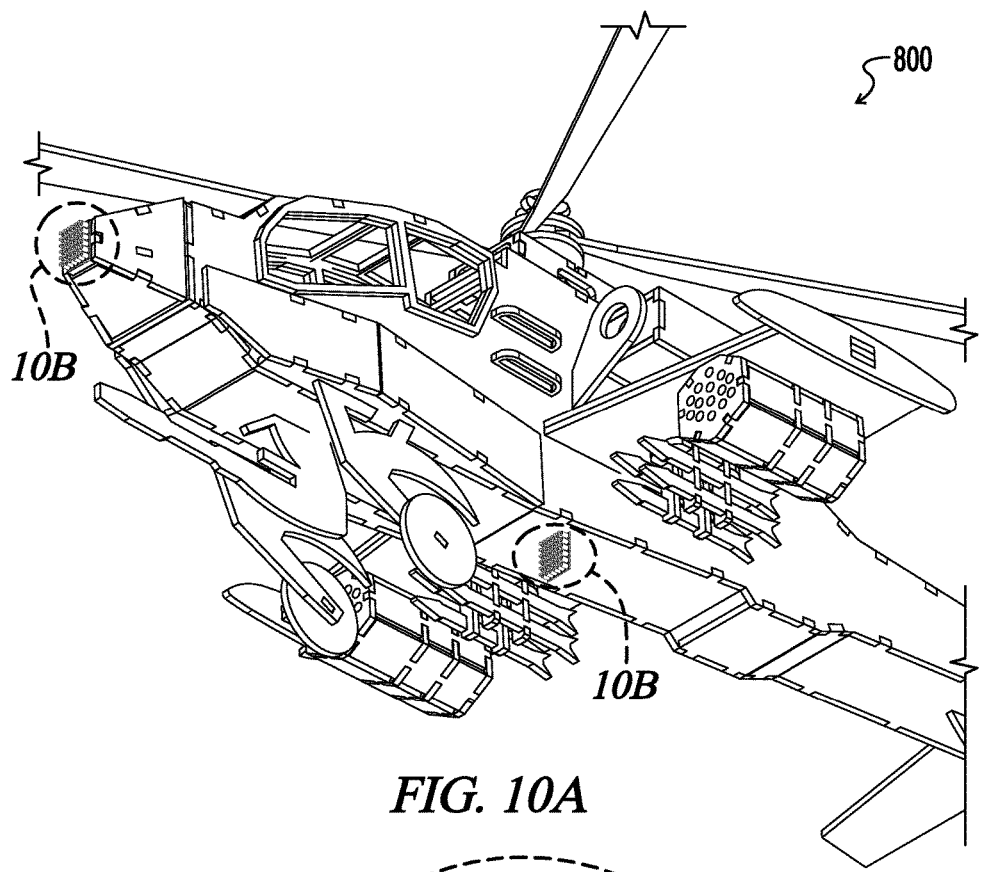
FIG. 10A is a three-dimensional perspective view of an aircraft.
Figure 10B:
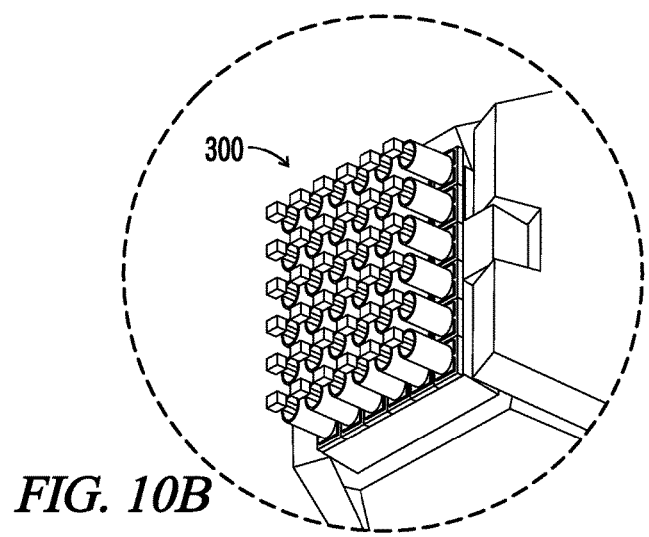
FIG. 10B is a three-dimensional perspective view of an exemplary embodiment of an airflow sensor array configured for use on an aircraft.

FIGS. 10A and 10B illustrate an exemplary embodiment of an array 300 of sensors 12 configured for sensing airflow while mounted on an aircraft 800. The aircraft 800 depicted by FIG. 10A is a helicopter, but in other embodiments, the aircraft 800 may comprise an airplane, a drone, a balloon, a missile, or other aircraft. In some situations, sensing low airflow velocities is a critical part of aviation safety. For example, risk of an aviation accident may increase because airspeed sensors of the aircraft 800, here, a helicopter, are unable to sufficiently detect horizontal, vertical and lateral movements of the aircraft 800, for example, during takeoff or landing. In such conditions, the speed of the aircraft 800 in a particular direction may be too low for conventional airspeed sensors to adequately detect air velocity and provide information about the movement of the aircraft 800 with sufficient accuracy or reliability. This is especially true for operation of the aircraft 800 in "brownout" conditions, such as when rotors of the aircraft 800 stir up large volumes of dust or particles and decrease or eliminate visibility for an operator. Thus, a system able to accurately and reliably sense airflow velocities across a wide range can improve safety of operation of the aircraft 800.

FIG. 10B depicts a close-up detail view of an array 300. Note that the array 300 comprises a plurality of sensors 12, with the sensors 12 configured to sense a range of airflow velocities, as noted above. In other embodiments, where sensing of airflow velocities in multiple directions may be desired, a plurality of arrays 300 may be positioned on the aircraft 800 in a configuration (e.g., a three-dimensional array 400) that will allow the desired sensing.

In the embodiment depicted by FIGS. 10A and 10B, the electrical signals generated by the respective sensors 12 of each array 300 on the aircraft 800 are communicated to the various systems of the aircraft 800, for example avionics and controls systems. Note that in some embodiments, the control element 35 and output device 500 may comprise existing systems of the aircraft 800, and a separate control element 35 and output device 500 are not required. Note also that any number of sensors 12 may be used in order to sense airflow as may be desired in accordance with the techniques described herein.

As shown by FIG. 10A, two arrays 300 in the configuration shown in detail by FIG. 10B are positioned at two separate locations on the aircraft 800. In the embodiment depicted by FIG. 10A, an array 300 is positioned on the outer surface of the nose of the aircraft 800 so that the array 300 can detect forward movement of the aircraft 800 based on changes in airflow, as described above. In addition, FIG. 10A depicts an array 300 positioned on an under side of the aircraft 800 and oriented so that it may detect forward movement of the aircraft 800, as described above. Other quantities of arrays 300 may be positioned on the surface of the aircraft 800 in other embodiments to sense airflow according to the techniques described herein as desired.

Figure 11A:
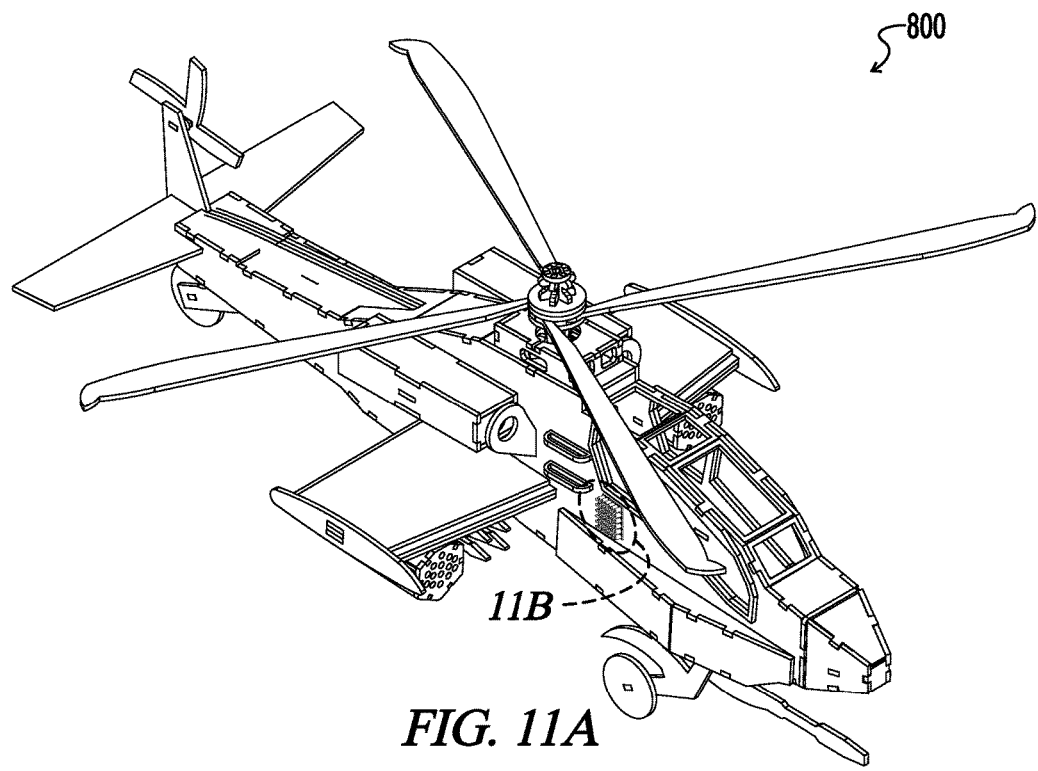
FIG. 11A is a side view illustrating an aircraft.
Figure 11B:
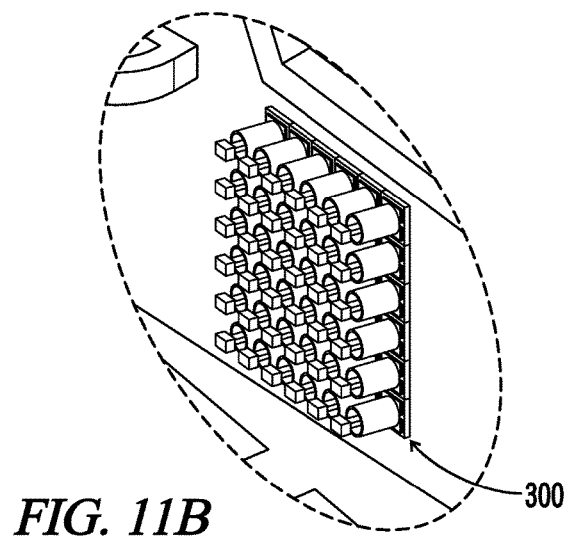
FIG. 11B is a three-dimensional perspective view of an exemplary embodiment of an airflow sensor array configured for use on an aircraft.

FIG. 11A depicts an exemplary embodiment of an array 300 of sensors 12 for sensing airflow mounted to a side of an aircraft 800. In the embodiment depicted by FIG. 11A, an array 300 is positioned on the outer surface of the side of the aircraft 800 so that the array 300 can detect lateral movement of the aircraft 800 based on changes in airflow, as described above. FIG. 11B shows a close-up detailed view of an array 300 of sensors 12 for sensing a range of airflow velocities as the aircraft 800 experiences lateral movement. As noted above, the position of the array 300 depicted by FIG. 11A enables the various sensors 12 of the array 300 to sense airflow experienced as the aircraft 800 moves laterally. This sensing becomes especially important during "brownout" conditions or during other conditions or situations when operator visibility is impaired or eliminated.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations and modifications thereof, which are within the spirit of the following claims.

Now, therefore, the following is claimed:

1. An airflow sensing system, comprising:
a first cantilever having a first beam, wherein a bluff body is formed at an end of the first beam for generating aerodynamic forces in response to an airflow;
a second cantilever having a second beam, wherein a second bluff body is formed at an end of the second beam for generating aerodynamic forces in response to the airflow;
a first piezoelectric element positioned on the first cantilever and configured to provide a first electrical signal indicative of a vibration of the first cantilever;
a second piezoelectric element positioned on the second cantilever and configured to provide a second electrical signal indicative of a vibration of the second cantilever;
a control element coupled to the first and second piezoelectric elements and configured to receive the first and second electrical signals, the control element further configured to determine, based on the first and second electrical signals, a velocity of an airflow causing each of the first and second cantilevers to vibrate;
an output device configured to provide an output based on the velocity; and
a shield positioned adjacent to the first cantilever for shielding the first beam from the airflow.

2. The system of claim 1, wherein the control element comprises a processor and memory, the processor programmed to determine the velocity based on each of the first and second electrical signals and to store a value indicative of the velocity in the memory.

3. The system of claim 1, wherein the control element is configured to determine the velocity based on a first frequency of the first electrical signal and a second frequency of the second electrical signal.

4. The system of claim 1, wherein the first cantilever is oriented in a first direction, wherein the second cantilever is oriented in a second direction, and wherein the first direction differs from the second direction.

5. The system of claim 4, wherein the first direction is orthogonal to the second direction.

6. The system of claim 5, wherein the first cantilever extends from a curved substrate.

7. The system of claim 1, further comprising:
a wind vane coupled to the first cantilever for rotating based on a direction of the airflow; and
a sensor for sensing a position of the wind vane,
wherein the control element is configured to determine a direction of the airflow based on the sensor.

8. The system of claim 1, wherein the first bluff body has a surface on a side of the first bluff body exposed to the airflow opposite of the first beam, and wherein the surface is curved thereby affecting the aerodynamic forces generated by the first bluff body.

9. The system of claim 1, wherein the first bluff body is shaped such that the first cantilever begins to gallop in response to the aerodynamic forces generated by the first bluff body when the airflow exceeds a threshold speed.

10. An airflow sensing system, comprising:
a first cantilever having a first beam, wherein a first bluff body is formed at an end of the first beam for generating aerodynamic forces in response to an airflow;
a second cantilever having a second beam, wherein a second bluff body is formed at an end of the second beam for generating aerodynamic forces in response to the airflow;
a first piezoelectric element associated with the first cantilever;
a second piezoelectric element associated with the second cantilever;
a control element coupled to each of the first and second piezoelectric elements, the control element configured to receive a first electrical signal generated by the first piezoelectric element and a second electrical signal generated by the second piezoelectric element, wherein the first electrical signal is indicative of vibration of the first cantilever induced by aerodynamic forces generated by the first bluff body, wherein the second electrical signal is indicative of vibration of the second cantilever induced by the aerodynamic forces generated by the second bluff body, and wherein the control element is configured to determine a velocity of the airflow based on the first and second electrical signals;
an output device in communication with the control element, wherein the control element is configured to provide an output via the output device based on the velocity;
a substrate from which the first cantilever extends; and
a shield coupled to the substrate and disposed around a longitudinal axis of the first cantilever.

11. The system of claim 10, wherein the control element is configured to determine the velocity of the airflow based on a first frequency of the first electrical signal and a second frequency of the second electrical signal.

12. The system of claim 10, wherein the control element further comprises logic configured to receive at least the first electrical signal, store the at least the first electrical signal in memory, generate an output signal, and communicate the output signal to the output device.

13. The system of claim 10, wherein the output device comprises a display for displaying the output.

14. The system of claim 10, wherein the output device is configured to transmit a message indicative of the velocity.

15. The system of claim 10, wherein the first cantilever is mounted on substrate, and wherein the first bluff body has a face on a side of the first bluff body opposite of the substrate.

16. The system of claim 15, wherein the face comprises a flat surface profile shape.

17. The system of claim 15, wherein the face comprises a curved surface profile shape.

18. An airflow sensing system, comprising:
a cantilever comprising a beam having an end, wherein a bluff body is formed at the end of the beam for generating aerodynamic forces in response to an airflow, and wherein the bluff body is shaped such that the cantilever begins to gallop in response to the aerodynamic forces when a speed of the airflow exceeds a threshold;
a piezoelectric element positioned on the cantilever and configured to provide an electrical signal indicative of a vibration of the cantilever;
a control element coupled to the piezoelectric element and configured to receive the electrical signal, the control element further configured determine, based on the electrical signal, the speed of the airflow;
an output device configured to provide an output based on the speed; and
a shield disposed around the cantilever for blocking the airflow.

19. The system of claim 18, wherein the bluff body has a surface on a side of the bluff body exposed to the airflow opposite of the beam, and wherein the surface is curved thereby affecting the aerodynamic forces generated by the bluff body.

20. The system of claim 18, wherein the control element is configured to determine the speed of the airflow based on a frequency of the electrical signal.

21. An airflow sensing method, comprising:
providing an airflow sensor having a cantilever, the cantilever comprising a beam having an end, wherein a bluff body is formed at the end of the beam;
positioning the airflow sensor within an airflow;
generating aerodynamic forces from the airflow with the bluff body, wherein the bluff body is shaped such that the aerodynamic forces cause the cantilever to begin galloping when a speed of the airflow exceeds a threshold;
sensing, with a piezoelectric element, vibration of the cantilever;

determining, with a control element, a speed of the airflow based on the sensing;

providing an output based on the speed; and shielding the beam from the airflow with a shield positioned adjacent to the cantilever.

22. The method of claim 21, wherein the bluff body has a surface on a side of the bluff body exposed to the airflow opposite of the beam, and wherein the surface is curved thereby affecting the aerodynamic forces.

23. The method of claim 21, further comprising determining a frequency of the electrical signal with the control element, wherein the determining the speed of the airflow is based on the determined frequency of the electrical signal.

* * * * *